United States Patent [19]

Balling

[11] Patent Number: 5,506,649
[45] Date of Patent: Apr. 9, 1996

[54] METHOD OF FORMING A FILM END IN A REVERSE CURL TO FACILITATE ITS EXTRACTION FROM A FILM CARTRIDGE

[75] Inventor: Edward N. Balling, Rochester, N.Y.

[73] Assignee: Eastman Kodak Company, Rochester, N.Y.

[21] Appl. No.: 391,750

[22] Filed: Feb. 21, 1995

[51] Int. Cl.$^6$ ...................................................... G03B 1/00
[52] U.S. Cl. ............................................ 354/212; 354/275
[58] Field of Search ....................................... 354/212, 275

[56] References Cited

U.S. PATENT DOCUMENTS

| | | | |
|---|---|---|---|
| 3,195,828 | 7/1965 | Kuckhoff et al. | 242/74.1 |
| 3,578,258 | 5/1971 | Gronton et al. | 242/74.1 |
| 3,622,099 | 11/1971 | Bishop | 242/74 |
| 3,944,155 | 3/1976 | Wilczewski et al. | 242/74 |
| 4,213,578 | 7/1980 | Katata | 242/74 |
| 4,880,181 | 11/1989 | Drahanowsky | 242/74 |
| 4,974,788 | 12/1990 | Covington | 242/74.1 |
| 5,452,033 | 9/1995 | Balling et al. | |

Primary Examiner—Monroe H. Hayes
Attorney, Agent, or Firm—Roger A. Fields

[57] ABSTRACT

A method of forming a reverse curl or similar crimp in a leading film end of a filmstrip to facilitate extraction of the leading film end from a film cartridge, comprises several steps. First, the leading film end is secured to a film take-up spool in a reverse curl or similar crimp which is opposite to an inherent curl of the filmstrip, to cause the leading film end to be set in the reverse curl. Then, the filmstrip is wound in conformity with its inherent curl into a film roll on the film take-up spool. And finally, the filmstrip is wound in conformity with its inherent curl into a film roll on a cartridge spool inside the film cartridge. As a result, the leading film end will be situated inside the film cartridge in the reverse curl to cause the leading film end to separate from the film roll inside the film cartridge in order to facilitate extraction of the leading film end from the film cartridge. Separating the leading film end from the film roll inside the film cartridge allows a manual film extractor to be slipped beneath the leading film end to engage the leading film end and pull it out of the film cartridge.

6 Claims, 5 Drawing Sheets

METHOD OF FORMING A FILM END IN A REVERSE CURL TO FACILITATE ITS EXTRACTION FROM A FILM CARTRIDGE

FIELD OF THE INVENTION

The invention relates generally to the field of photography, and in particular to a method of forming a leading film end in a reverse curl or similar crimp to facilitate its extraction from a film cartridge. The reverse curl causes the leading film end to separate from a film roll inside the film cartridge, allowing a manual film extractor to be slipped beneath the leading film end to engage the leading film end and pull it out of the film cartridge.

BACKGROUND OF THE INVENTION

Film and cameras that are all in one, commonly referred to as single-use or one-time-use cameras, have recently become well known. Typically, the single-use camera is a simple point-and-shoot type comprising a plastic, inner, main body part which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear casing or cover parts house the main body part between them to form a light-tight camera unit. A decorative cardboard outer box contains the camera unit and has respective openings for the taking lens, the shutter release button, the film advance thumbwheel, the viewfinder, the frame counter, and a flash emission window.

At the manufacturer, the main body part is loaded with a 12, 24, or 36 exposure 35 mm film cartridge, and the front and rear casing parts are connected to each other and/or to the main body part to assemble a-light-tight camera unit. Then, an exposed end of a take-up spool in the main body part is rotated to factory prewind substantially the entire length of the unexposed filmstrip from the cartridge shell or housing onto the spool. Lastly, the outer box is placed on the camera unit.

After the photographer takes a picture with the single-use camera, he or she manually rotates the thumbwheel to rotate a cartridge spool inside the cartridge shell to rewind the exposed frame into the cartridge shell. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cartridge shell, the single-use camera is given to a photofinisher who tears the outer box off the camera unit, separates the rear cover part from the main body part, and removes the film cartridge with the filmstrip from the main body part. Then, he removes the filmstrip from the cartridge shell to develop the negatives and make prints for the customer, and he forwards the used camera parts to the manufacturer for recycling, i.e. remanufacture.

To remove the filmstrip from the cartridge shell, it is customary to break open the cartridge shell or insert a manual film extractor inwardly through a light-trapping slit in the cartridge shell to engage a leading film end of a film roll on the cartridge spool. The tighter the wrap of the film roll about the cartridge spool, the more difficult it is for the manual film extractor to engage the leading film end because of the tendency of the leading film end to curl against the film roll.

SUMMARY OF THE INVENTION

A method of forming a reverse curl or similar crimp in a leading film end of a filmstrip to facilitate extraction of the leading film end from a film cartridge, comprising:

securing the leading film end to a film take-up spool in a reverse curl or similar crimp which is opposite to an inherent curl of the filmstrip, to cause the leading film end to be set in the reverse curl;

winding the filmstrip in conformity with its inherent curl into a film roll on the film take-up spool; and winding the filmstrip in conformity with its inherent curl into a film roll on a cartridge spool inside the film cartridge, whereby the leading film end will be situated inside the film cartridge in the reverse curl to cause the leading film end to separate from the film roll inside the film cartridge in order to facilitate extraction of the leading film end from the film cartridge. Separating the leading film end from the film roll inside the film cartridge allows a manual film extractor to be slipped beneath the leading film end to engage the leading film end and pull it out of the film cartridge.

DETAILED DESCRIPTION OF THE INVENTION

The invention is disclosed as being embodied preferably in a single-use 35 mm camera. Because the features of a single-use 35 mm camera are generally known as shown for example in prior art U.S. Pat. No. 5,181,057, issued Jan. 19, 1993, the description which follows is directed in particular only to those elements forming part of or cooperating directly with the disclosed embodiment. It is to be understood, however, that other elements may take various forms known to a person of ordinary skill in the art.

Figure 1:
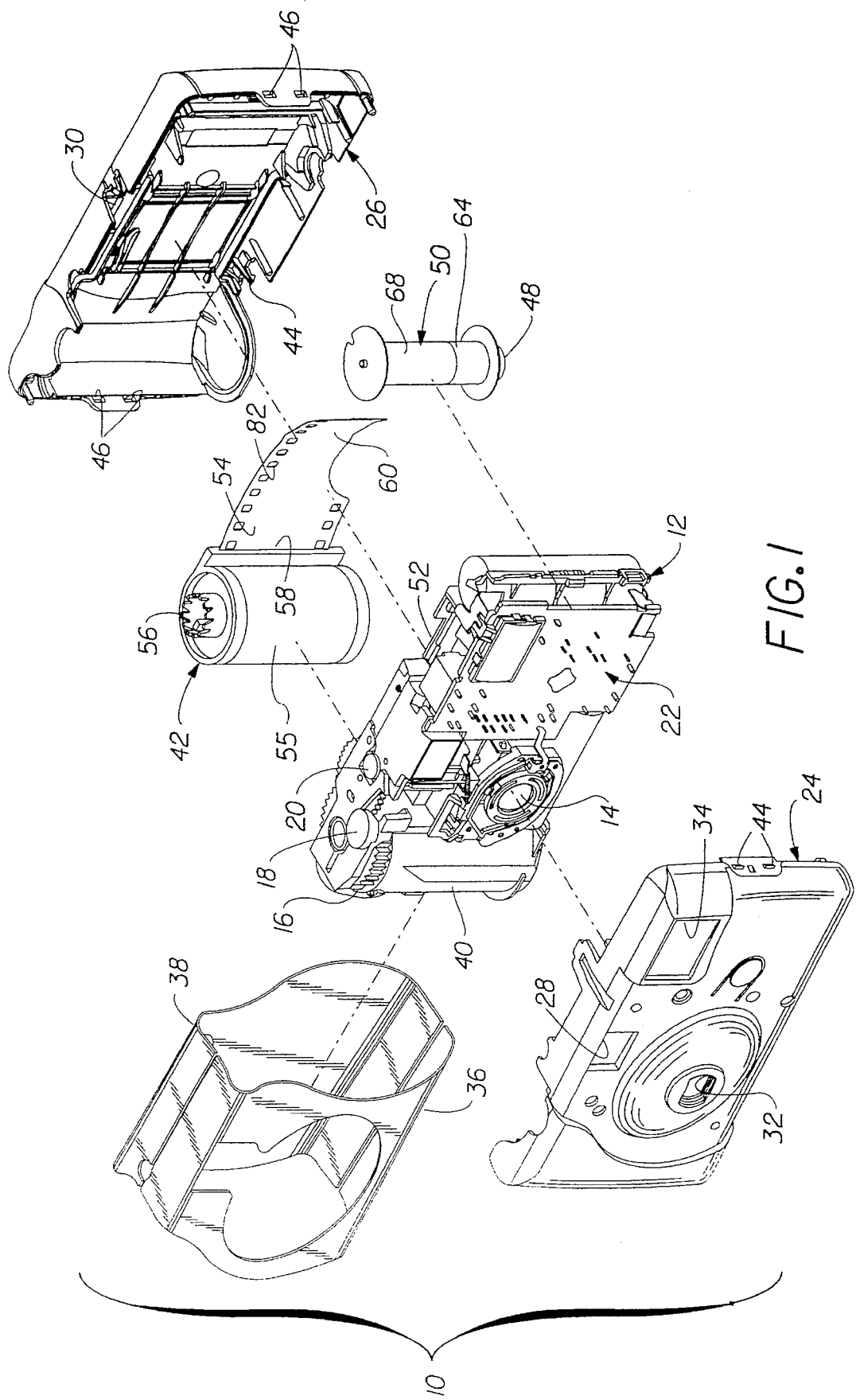
FIG. 1 is an exploded perspective view of a single-use camera.
Figure 2:
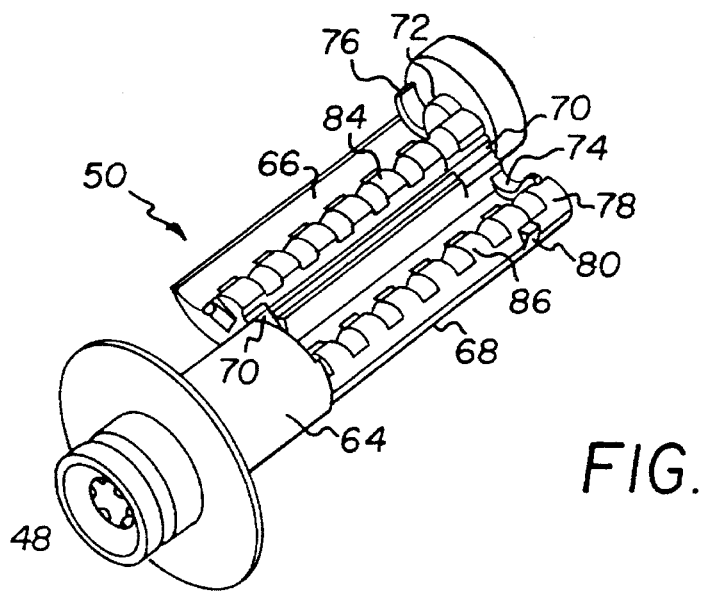
FIG. 2 is a perspective view of a film take-up spool in the camera, showing the spool opened to secure a leading film end in a reverse curl or similar crimp.
Figure 3:
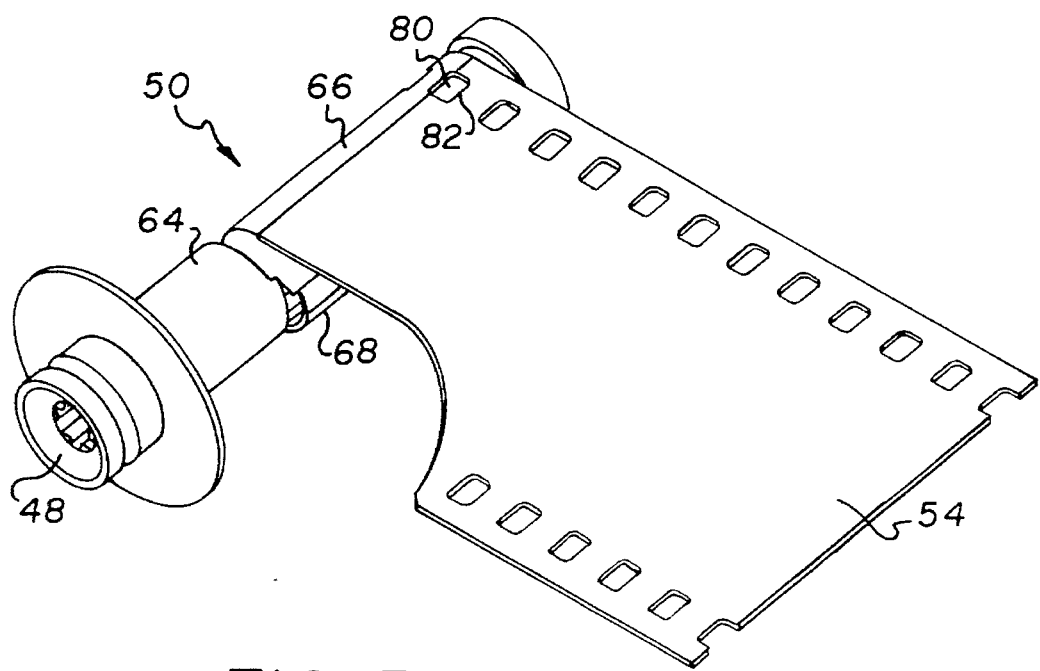
FIG. 3 is a is a perspective view similar to FIG. 2, showing the film take-up spool closed with the leading film end secured in the reverse curl to the spool.

Referring now to the drawings, FIG. 1 depicts a single-use 35 mm camera 10 which is a simple point- and shoot type comprising a plastic, inner, main body part or frame 12 which supports a number of typical camera components, for example, a fixed-focus taking lens 14, a film metering mechanism, not shown, a manual film advance thumbwheel 16, a single-blade shutter, not shown, a manual shutter release button 18, a frame counter 20 for indicating the number of exposures remaining for picture-taking, and an electronic flash unit 22. Plastic front and rear casing or cover parts 24 and 26 house the main body part 12 between them to form a light-tight camera unit. The front and rear cover parts 24 and 26 have front and rear viewfinder windows 28 and 30, and the front cover part has a lens opening 32 and a flash emission opening 34. Front and rear decorative labels 36 and 38 cover central portions of the front and rear cover parts 24 and 26.

At the manufacturer, a cartridge-receiving chamber 40 in the main body part 12 is loaded with a 12, 24, or 36 exposure 35 mm film cartridge 42. See FIG. 1. Then, the front and rear cover parts 24 and 26 are connected to each other with the main body portion 12 between them to assemble a light-tight camera unit. A plurality of hooks 44 and a like number of mating holes 46, only partly shown, on the front and rear cover parts 24 and 26 engage to connect the front and rear cover parts together. Then, in a known manner, a rotational device such as a powered screwdriver, not shown, is engaged with an exposed end 48 of a film take-up spool 50 in a film roll chamber 52 in the main body part 12 to rotate the spool to factory prewind substantially the entire length of the unexposed filmstrip 54 from the cartridge shell 55 onto the spool. Lastly, the decorative labels 36 and 38 are placed on the front and rear cover parts 24 and 26.

After the photographer takes a picture with the single-use camera 10, he or she manually rotates the thumbwheel 16 to rotate a cartridge spool 56 inside the cartridge shell 55 to rewind the exposed frame into the cartridge shell. The rewinding movement of the filmstrip 54 the equivalent of slightly more than one frame width rotates a metering sprocket, not shown, in engagement with the filmstrip to decrement the frame counter 20 to its next lower-numbered setting. When the maximum number of exposures available on the filmstrip 54 are exposed and the filmstrip is completely rewound into the cartridge shell 55, the single-use camera 10 is given to a photofinisher. The photofinisher disengages only the two hooks, not shown, and the corresponding holes 46 located at the left-hand sides of the front and rear cover parts 24 and 26, as viewed in FIG. 1, in order to fold the rear cover part back at a groove 57 and uncover the cartridge-receiving chamber 40. Then, he removes the film cartridge 42 with the filmstrip 54 from the cartridge-receiving chamber 40, he removes the filmstrip from the cartridge shell 55 to develop the negatives and make prints for the customer, and he forwards the main body part 12, the front and rear cover parts 24 and 26, and the film spool 50 to the manufacturer for recycling, i.e. remanufacture.

To remove the filmstrip 54 from the cartridge shell 55, it is customary to break open the cartridge shell or insert a manual film extractor, not shown, inwardly through a light-trapping slit 58 in the cartridge shell to engage a leading film end 60 of a film roll 62 on the cartridge spool 56. See FIG. 8. Typically, the tighter the wrap of the film roll 62 about the cartridge spool 56, the more difficult it is for the manual film extractor to engage the leading film end 60 because of the tendency of the leading film end to curl against the film roll.

Figure 4:
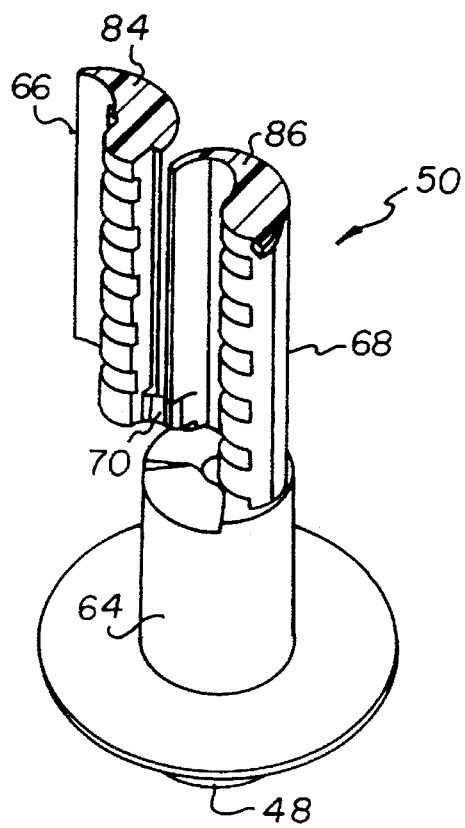
FIGS. 4 and 5 are perspective views similar to FIG. 2, showing the film take-up spool (without the leading film end) cut off at different lengths to illustrate different portions of its interior.
Figure 5:
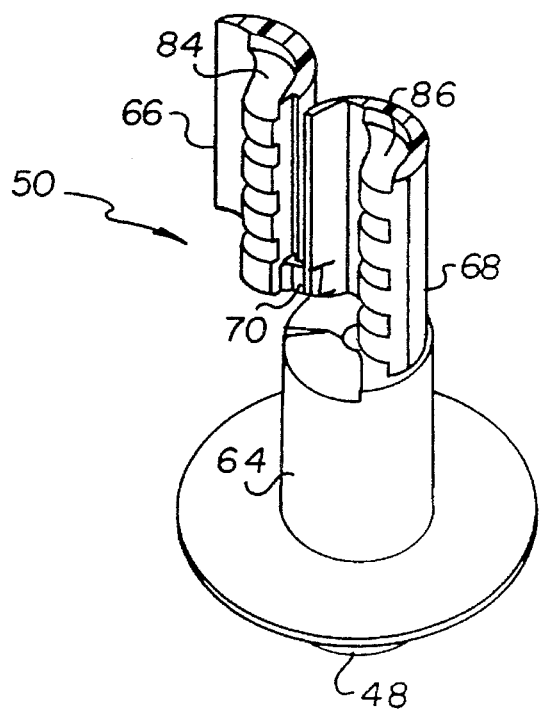
Figure 6:
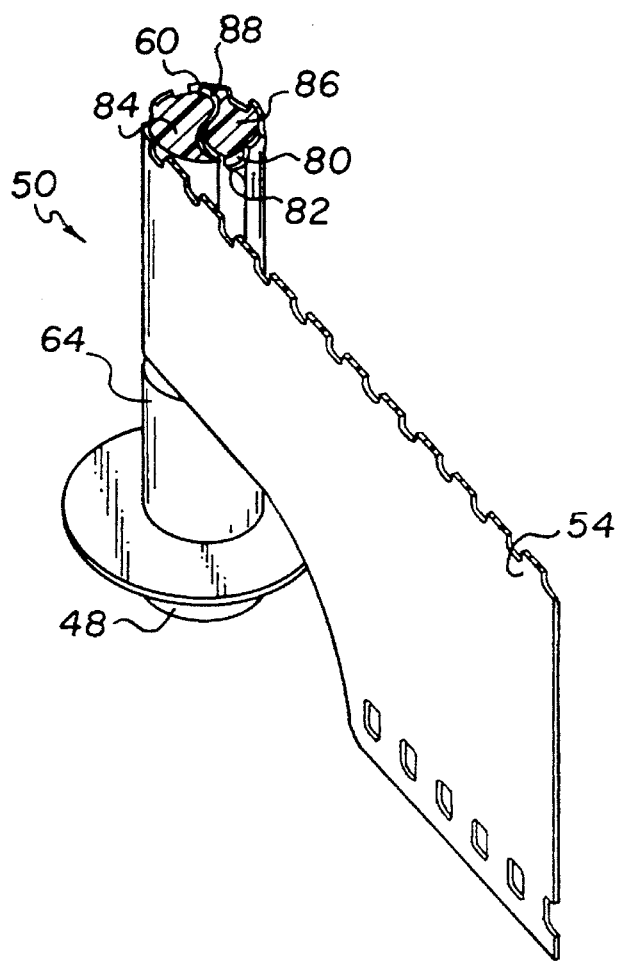
FIGS. 6 and 7 are perspective views similar to FIG. 3, showing the film take-up spool (with the leading film end) cut off at different lengths to illustrate different portions of its interior.

The film take-up spool 50 is shown in FIGS. 2–7 with one of its end flanges removed to illustrate certain features of the spool. As shown, a smooth-periphery central core 64 of the film take-up spool 60 is longitudinally split into two core portions 66 and 68 connected via a pair of integral spaced living hinges 70. This permits the core portions 66 and 68 to be closed to secure the leading film end 60 between them and to be opened to release the leading film end. See FIGS. 2 and 3. When the core portions 66 and 68 are closed with the leading film end 60 between them, respective latching convex and concave parts 72 and 74 of the core portions 66 and 68 snap together to releasably engage to hold the core portions closed, an arcuate part 76 of the core portion 66 fits over a mating part 78 of the core portion 68, and an exterior tooth 80 of the core portion 68 is received in a perforation 82 in the leading film end. As shown in FIGS. 4–6, the core portions 66 and 68 have respective series of complementary-curved parts 84 and 86 which, when the core portions are closed with the leading film end 60 between them, form the leading film end into an s-shaped reverse curl or similar crimp 88. The reverse curl 88 is opposite to the inherent curl of the filmstrip 54 and to the film wrap about the film take-up spool 50 and the cartridge spool 56

Figure 7:
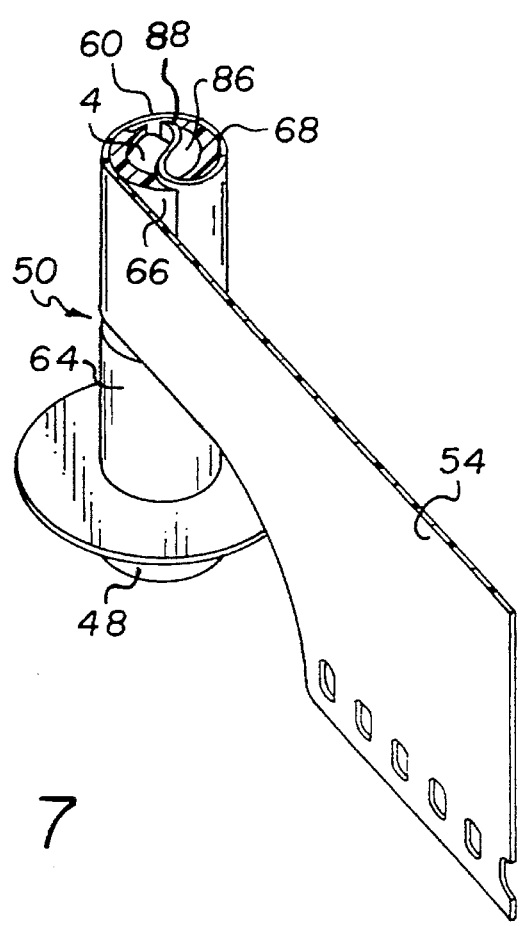
Figure 8:
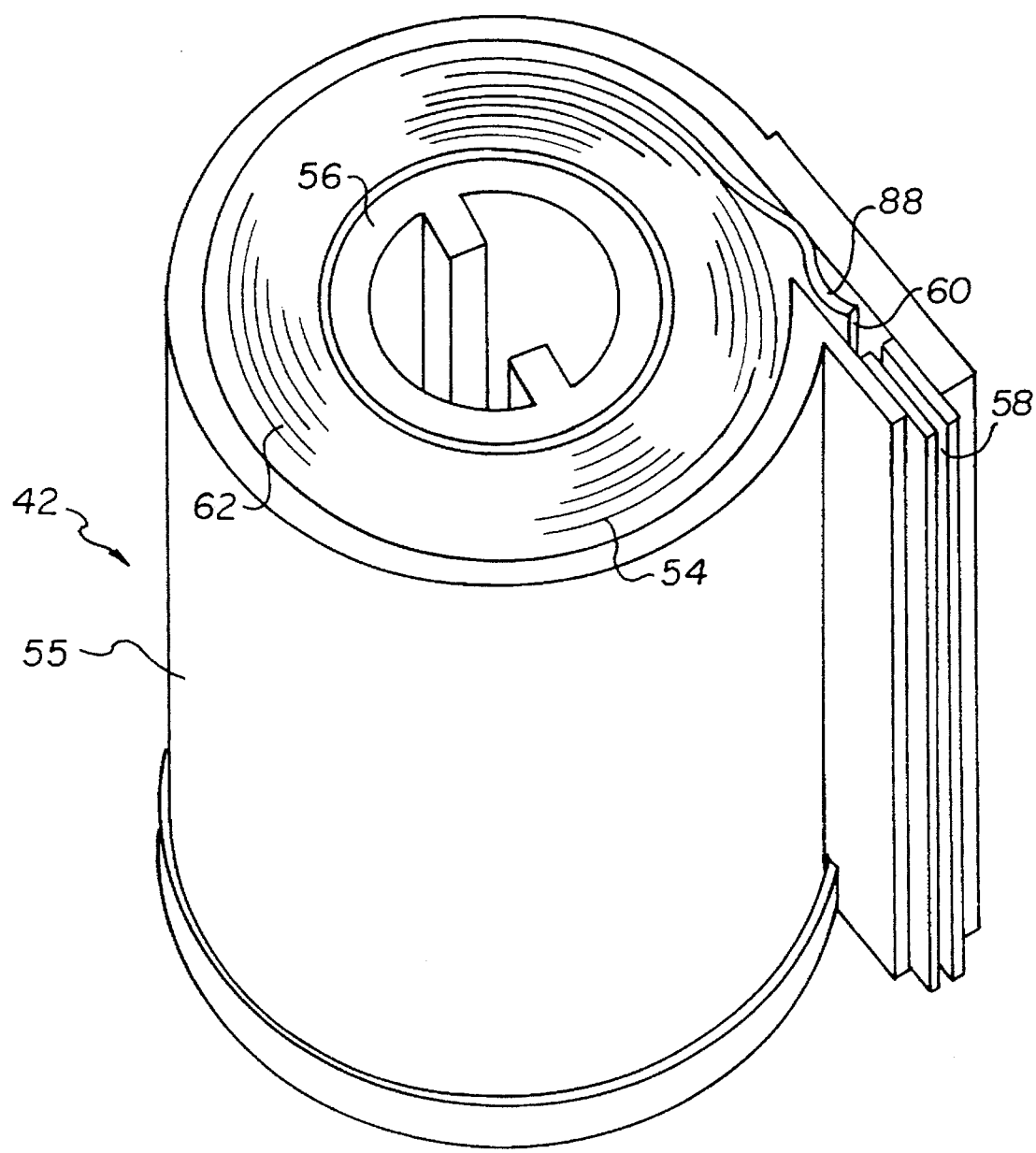
FIG. 8 is a perspective view of a film cartridge in the camera, showing how the reverse film curl in the leading film end causes the leading film end to separate from a film roll inside the film cartridge.

According to the invention, there is provided a method of forming the reverse curl 88 in the leading film end 60 of the filmstrip 54 to facilitate extraction of the leading film end from the cartridge shell 55, comprising:

securing the leading film end 84 to the film take-up spool 50 in the reverse curl 88 as shown in FIGS. 6 and 7, to cause the leading film end to be set in the reverse curl;

winding the filmstrip 54 in conformity with its inherent curl into a film roll on the film take-up spool 50; and winding the filmstrip 54 in conformity with its inherent curl into a film roll 62 on the cartridge spool 56, whereby the leading film end 60 will be situated inside the film cartridge 42 in the reverse curl 88 to cause the leading film end to separate from the film roll inside the film cartridge 42 in order to facilitate extraction of the leading film end from the film cartridge. See FIG. 8. Separating the leading film end 60 from the film roll 62 inside the film cartridge 42, as shown in FIG. 8, allows a manual film extractor, not shown, to be slipped beneath the leading film end to engage the leading film end and pull it out of the film cartridge.

The invention has been described with reference to a preferred embodiment. However, it will be appreciated that variations and modifications can be effected by a person of ordinary skill in the art without departing from the scope of the invention.

PARTS LIST 10. single-use camera
12. main body part
14. taking lens
16. film advance thumbwheel
18. shutter release button
20. frame counter
22. electronic flash unit
24. front cover part
26. rear cover part
28. front viewfinder window
30. rear viewfinder window
32. lens opening
34. flash emission window
36. front label
38. rear label
40. cartridge-receiving chamber
42. film cartridge
44. hooks
46. mating holes
48. exposed spool end 50. film spool
52. film roll chamber
54. filmstrip
55. cartridge shell
56. cartridge spool
57. groove
58. light-trapping slit
60. leading film end
62. film roll
64. central core
66. core portion
68. core portion
70. pair of spaced hinges
72. latching convex part
74. latching concave part
76. arcuate part
78. mating part
80. tooth
82. film perforation
84. complementary-curved part
86. complementary-curved part
88. s-shaped reverse film curl

I claim:

1. A method of forming a reverse curl or similar crimp in a leading film end of a filmstrip to facilitate extraction of the leading film end from a film cartridge, comprising:

securing the leading film end to a film takeup spool in a reverse curl or similar crimp which is opposite to an inherent curl of the filmstrip, to cause the leading film end to be set in the reverse curl;

winding the filmstrip in conformity with its inherent curl into a film roll on the film take-up spool; and winding the filmstrip in conformity with its inherent curl into a film roll on a cartridge spool inside the film cartridge, whereby the leading film end will be situated inside the film cartridge in the reverse curl to cause the leading film end to separate from the film roll inside the film cartridge in order to facilitate extraction of the leading film end from the film cartridge.

2. A method as recited in claim 1, wherein the filmstrip is wound on the film take-up spool and on the cartridge spool in a camera.

3. A method as recited in claim 2, wherein the leading film end is secured in the reverse curl to the film take-up spool in the camera.

4. A method as recited in claim 2, wherein the leading film end is secured in the reverse curl to the film take-up spool out of the camera.

5. A method as recited in claim 1, wherein a pair of hinged complementary-curved core portions of the film take-up spool are folded together with the leading film end between them to secure the leading film end in the reverse curl to the film take-up spool.

6. A camera comprising:

a film take-up spool having integral means for securing a leading film end of a filmstrip to said film take-up spool in a reverse curl or similar crimp which is opposite to an inherent curl of the filmstrip, to cause the leading film end to be set in the reverse curl, and being supported for rotation to wind the filmstrip in conformity with its inherent curl into a film roll on the film take-up spool; and means for winding the filmstrip in conformity with its inherent curl into a film roll on a cartridge spool inside a film cartridge in said camera, whereby the leading film end will be situated inside the film cartridge in the reverse curl to cause the leading film end to separate from the film roll inside the film cartridge in order to facilitate extraction of the leading film end from the film cartridge when the film cartridge is removed from the camera.

* * * * *